United States Patent
Parkhouse et al.

(10) Patent No.: US 10,907,342 B1
(45) Date of Patent: Feb. 2, 2021

(54) CONNECTION NODE FOR MODULAR BUILDING STRUCTURES

(71) Applicant: Assembly OSM, Inc., New York, NY (US)

(72) Inventors: Leon Parkhouse, Ventura, CA (US); Andrea Vittadini, Brooklyn, NY (US); Matthew Charles John Clark, Brooklyn, NY (US); Simone Andreatta, Pordenone (IT); Victoire Morgane Chloe Saby, Brooklyn, NY (US)

(73) Assignee: Assembly OSM, Inc., New York, NY (US)

( * ) Notice: Subject to any disclaimer, the term of this patent is extended or adjusted under 35 U.S.C. 154(b) by 0 days.

(21) Appl. No.: 16/987,641

(22) Filed: Aug. 7, 2020

Related U.S. Application Data

(60) Provisional application No. 62/971,669, filed on Feb. 7, 2020.

(51) Int. Cl.
| | |
|---|---|
| *E04B 1/24* | (2006.01) |
| *F16B 12/30* | (2006.01) |
| *E04B 1/41* | (2006.01) |
| *E04B 1/348* | (2006.01) |
| *F16B 7/18* | (2006.01) |

(52) U.S. Cl.
CPC .......... *E04B 1/2403* (2013.01); *E04B 1/3483* (2013.01); *E04B 1/40* (2013.01); *F16B 7/182* (2013.01); *F16B 12/30* (2013.01); *E04B 2001/246* (2013.01); *E04B 2001/2406* (2013.01); *E04B 2001/2415* (2013.01); *E04B 2001/2418* (2013.01); *E04B 2001/2451* (2013.01); *E04B 2001/2466* (2013.01)

(58) Field of Classification Search
CPC ...... E04B 1/2403; E04B 1/34836; E04B 1/40; E04B 1/1912; E04B 2001/2406; F16B 7/182
See application file for complete search history.

(56) References Cited

U.S. PATENT DOCUMENTS

| | | | | |
|---|---|---|---|---|
| 3,563,581 | A * | 2/1971 | Sommerstein | E04B 1/1912 403/217 |
| 4,082,470 | A * | 4/1978 | Alberts | F16B 7/185 403/172 |
| 4,271,654 | A * | 6/1981 | Jungbluth | E04B 1/1912 52/637 |
| 4,758,111 | A * | 7/1988 | Vitta | E04B 1/34315 403/176 |

(Continued)

*Primary Examiner* — Paola Agudelo
(74) *Attorney, Agent, or Firm* — Gottlieb, Rackman & Reisman, P.C.

(57) ABSTRACT

A connection node assembly for use in connecting an upper prefabricated building module to a lower module. Hollow vertical edge supports of the building modules have top and bottom connection parts. A connecting bolt can be passed through the top part of an upper vertical support in the upper building module and seated within the bottom part of that vertical support with the shank extending downward. The shank engages a threaded aperture in a connecting nut secured within the top part of a corresponding lower vertical support in the lower building module. Diaphragm plates sandwiched between the upper and lower vertical supports are used to tie horizontally placed modules together.

20 Claims, 17 Drawing Sheets

(56) References Cited

U.S. PATENT DOCUMENTS

| | | | | |
|---|---|---|---|---|
| 4,780,018 | A * | 10/1988 | Godden | E04B 1/1906 |
| | | | | 403/173 |
| 5,860,258 | A | 1/1999 | Faith et al. | |
| 6,390,719 | B1 * | 5/2002 | Chan | E04B 1/5806 |
| | | | | 403/205 |
| 9,458,619 | B2 * | 10/2016 | Bowron | E04B 1/40 |
| 10,450,737 | B2 | 10/2019 | Bowron | |
| 2016/0017595 | A1 * | 1/2016 | Lee | E04B 1/5818 |
| | | | | 52/653.2 |
| 2017/0002559 | A1 | 1/2017 | Bowron et al. | |
| 2017/0191515 | A1 * | 7/2017 | Kwon | F16B 7/185 |
| 2018/0135295 | A1 | 5/2018 | Bowron | |
| 2018/0148919 | A1 * | 5/2018 | Rebollar Buldain | |
| | | | | E04B 1/2403 |
| 2019/0078321 | A1 * | 3/2019 | Bowron | E04G 21/142 |
| 2019/0153720 | A1 * | 5/2019 | Bonlin | E04B 1/3483 |
| 2019/0330838 | A1 | 10/2019 | Bowron | |
| 2020/0056368 | A1 * | 2/2020 | Adachi | E04B 1/40 |

* cited by examiner

CONNECTION NODE FOR MODULAR BUILDING STRUCTURES

CROSS-REFERENCE TO RELATED APPLICATIONS

This application claims priority from U.S. provisional application Ser. No. 62/971,669 filed on Feb. 7, 2020, the entire contents of which is expressly incorporated by reference.

FIELD OF THE INVENTION

The present invention relates to a connection node assembly for use in connecting prefabricated building modules together and to a module support component having connection node assembly components formed therein.

BACKGROUND

Many high-rise buildings are constructed using pre-fabricated modules that are stacked and joined together on-site. Each module is a generally box shaped unit with a primary chassis comprising vertical support posts and horizontal cross members joined together at corner nodes. Typically, the vertical supports in a module are hollow support structure (HSS), such as steel profiles with a square or rectangular cross-section. A prefabricated module may also be at least partially finished with internal walls, flooring, and hookups for electricity and water.

During construction, an initial tier of modules is installed horizontally and affixed to a building foundation or previously installed substructure. Adjacent top corners of the modules are connected together with a joining plate. A second tier of modules is positioned over the first tier, aligned and positioned in place. The bottom corners of the second tier modules are then affixed to the top corners of the first tier modules.

An advantage of using prefabricated modules is that they can be assembled inside and remotely from the construction site, reducing the amount of outdoor work that must be done at the construction site itself. Notwithstanding, job-site construction often continues in a wide variety of weather conditions. To prevent water from getting into the module assembly and damaging pre-installed components, the module, as supplied, can have an outer weatherproofing layer. Care must be taken during construction to avoid damaging the weatherproofing layer.

Typically, volumetric modular buildings rely on a separate structure to provide lateral stability against horizontal loads (such as a concrete core or an external steel brace-frame). Each module is only responsible for carrying vertical loads to the tiers below through its vertical columns.

Standard methods and systems for connecting prefab building modules during erection are designed to ensure vertical continuity between stacked columns and horizontal continuity between modules of the same level. Continuity is typically achieved by means of large joining plates to connect the corners of adjacent modules. These plates extend well past the vertical support members and are affixed to structures on the horizontal support beams where the connection points are accessible by the installers.

Such use of large joining plates that extend past the vertical support members may require the weatherproofing layer to be peeled back around the corners of the module in order to expose the horizontal support beams to which the plate is connected. However, doing this also exposes a relatively large area of the module itself around the corner and can damage the weatherproofing layer. As a result, there is an increased chance of water gaining entry to the interior of the module during construction and causing damage to interior components.

Further, conventional joining systems often require construction personnel to be positioned at the base of the module when connecting it to a module below. Limited visual and physical access to the corner connections from this position can make proper alignment difficult to achieve. Due to factors such as this, deficiencies in installation control, as well as fabrication tolerances, the installation tolerance in volumetric modular construction is normally in the 0.25 inch to one inch range and modules often need to be manually jacked into their proper alignment after they have been installed. Such misalignments exceed by far the installation tolerances for standard building facade systems which are applied to the outer walls of the building. As a result, much if not all of the facade installation operations need to be done on site and this can introduce conspicuous delays to the stacking schedule.

There is a need for an improved method and system for connecting building modules during construction that provides greater accuracy and superior load distribution characteristics along the vertical supports while providing a simplified and safer installation process that can be employed without having to disturb weatherproofing on the module.

SUMMARY

These and other needs are met by a connection node system for use in joining hollow vertical supports of building modules configured so that vertical supports can be connected vertically to each other by a bolt that is passed inside the interior of an upper support and through the bottom of the upper vertical support to connect to the top of the vertical support on the lower vertical support.

In an embodiment, the connection node system is largely integrated within the vertical supports that are used in chassis of a modular building unit. Each respective vertical support has a hollow elongated body that extends along a central axis. A first connection portion is formed at the bottom of each support and will be the top portion of the connection node system when that support is mounted on top of a lower support. The first connection portion has an axial bore through it opening into the interior of the support. The axial bore is configured so that a connecting bolt can be passed down through the interior of the support and seat on a shoulder within the bore with the bolt's shank extending out from the support.

A second connection portion is formed on the top of each support and will be the bottom portion of the connection node system when that support is mounted beneath an upper support. The second connection portion comprises an axial hole extending to the interior of the support. The axial hole has a diameter throughout greater than the head diameter of the connecting bolts to permit a bolt and associated drive socket to be fed through the second connection portion and through the support's interior allowing the bolt to engage the bore in the first connection portion. The axial hole should also be large enough to allow a tool for tightening the bolt to be passed through. The axial hole has an internally facing shoulder and is configured so a coupler nut in an insertion position can be placed into the axial hole along the axis and then rotated axially to a captured position where the shoulder blocks axial motion of the coupler towards the second end. The coupler nut has a threaded aperture to receive the shank of the bolt extending out from the first connection portion of an upper support.

The supports can be steel hollow support structures that can have a rectangular (including square) or other cross-sectional shape. The coupling nut can have the same cross-section shape as the support or a different shape. The axial hole has a first open area adjacent to the end of the support. The first open area can have the same cross-section shape as the coupling nut and is large enough to allow the nut to pass through. A second open area is axially inward and adjacent to the first open area. The second open area can have a circular cross-section with a diameter substantially the same as the maximum diameter of the first open area. The larger second open area defines inward facing shoulders adjacent to the first open area which prevents the coupler nut from being removed when rotated to a captured position. A third open area formed inward from the second area nut keeps the coupler nut from passing inward beyond the second area. The first open area can have the same shape or different shape as the support cross-section, such as square, and can be rotated thereto so that sides defining the first open area are not parallel to the sides of the support.

One or more locking holes can be provided in the end surface of the second connecting part and that extend through to the second open area. The locking holes are positioned so that when a locking pin is inserted into the locking hole, the locking pin restricts rotation of a coupler in the captured position within the second open area.

A diaphragm plate can be provided to connect the tops of horizontally adjacent vertical supports. The diaphragm plate has a plurality of bolt apertures that are positioned to align with the threaded apertures in coupler nuts mounted in the second connection portions of the adjacent supports. The diaphragm plate can also have vertically extending alignment members (such as circular or diamond profile pins or cones) that mate with corresponding alignment features in the first connecting portion of a vertical support being lowered therein.

Alignment holes can also be formed in the diaphragm plate and the second connecting portion and/or the coupler nut. The alignment holes are positioned so that when the coupler is in the captured position in the second connection part, the diaphragm plate can be positioned over the second connection part with the diaphragm alignment hole and coupler alignment hole axially aligned and the bolt aperture axially aligned with the axial hole in the second connector part. Locking bolts placed through the diaphragm alignment holes and into the coupler alignment holes can be used to temporarily hold the diaphragm plate in alignment over one vertical support while the vertical support from an upper module is lowered over another portion of the diaphragm. A bolt can also be temporarily inserted through the diaphragm plate into the coupler nut. Once the diaphragm is clamped in place under that other vertical support, the locking bolts and diaphragm plate bolt can be removed.

A lifting plate with the same basic shape as the coupler nut can also be provided. Instead of a threaded aperture, the lifting plate has a lifting eye. The lifting plate can be mounted in the second portion of the vertical supports (e.g., at the top) in the same manner as a coupler nut and the lifting eye used as a cable connection point for hoisting the module into place. When the module is correctly placed, the lifting plate can be removed.

Advantageously, the internal bolting configuration allows building modules to be connected without having to disturb existing weatherproofing. The diaphragm plate can also be reduced in size so that it only covers the tops of the adjacent vertical supports, reducing weight and material cost. The connection node system, as disclosed, allows a node of eight module corners (where four upper and four lower modules come together) to be securely joined together using only four bolts and an appropriately configured diaphragm plate. Because a connecting bolt is inserted through the top of the vertical support on an upper module and tightened using an elongated wrench assembly operated from above the upper, module workers need to spend less time working at the bottom of a module thereby increasing worker safety.

The bolted connection can resist tension as required by various building codes, even if the connection remains in compression during its use in all load cases. The bolt can be pre-tensioned during construction during the stacking procedure. This bolted connection turns individual module columns into continuous steel columns from the bottom to the top of the building. When rectangular modules are stacked, neighboring corner columns sit side by side in configurations of two (at the façade) or four (internally). At the corners and irregular shaped areas of a building there may also be configurations of one (i.e. a single column) or three. Differently shaped modules, such as hexagons, would have more possible configurations. The diaphragm plate placed on top of columns connects side by side neighboring columns together during stacking. The column bolts from the modules above pass through holes in the diaphragm plate and the diaphragm plate operates to create a tying load path laterally between all columns in the group.

The chassis components can be assembled at the offsite module assembly facility by bolting the components together. This allows for efficient transport to the module assembly facility by transporting the pre-assembled frames and beams in a flat pack configuration rather than a volumetric configuration. This enables the industry best practice of not "shipping air".

The simple bolted construction at the offsite assembly facility eliminates any need for welded joints, thus reducing the time to assemble and inspect the components, and reducing the labor content overall. The lack of welding at the assembly facility and the construction site reduces the level of skill required to erect the building and lowers the overall cost of labor and inspection.

The bolted connections provide for significantly tighter control of build tolerances, allowing for stacking with a curtain wall façade pre-installed on the modules. Components can be machined for tight tolerance assembly and then assembled and inspected to tighter tolerances without incurring significant cost.

The use of standardized components allows for efficiencies of scale in their production, such as development of tooling for the rapid setup of CNC machinery to perform the final machining of a cross beam, including the location of the bolt holes.

DESCRIPTION OF THE DRAWINGS

Further features and advantages of the invention, as well as structure and operation of various aspects of the methods and systems of the invention the implementations are disclosed in detail below with references to the accompanying drawings, in which.

DETAILED DESCRIPTION

Figure 1A:
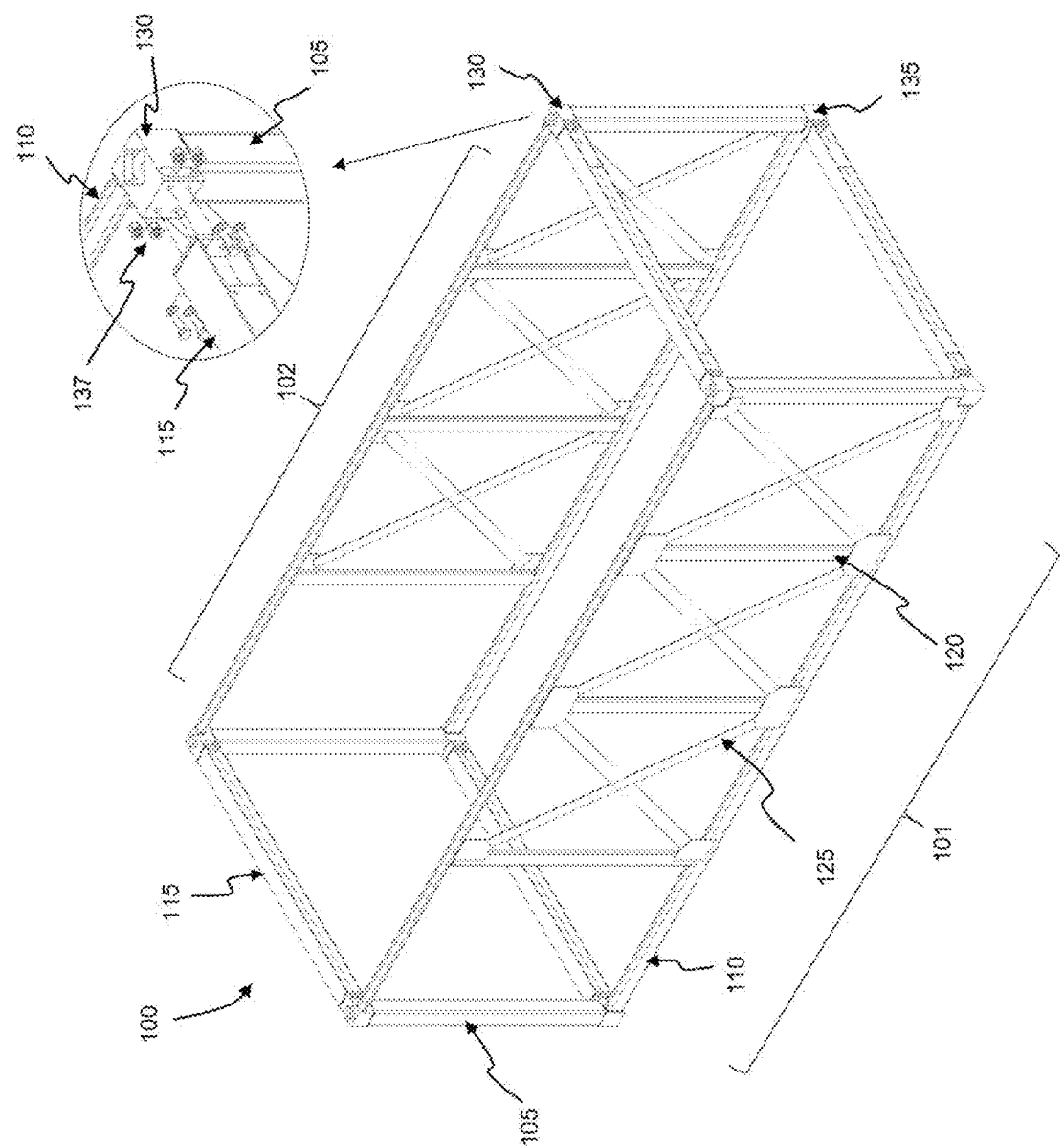
FIG. 1A is an illustration of a representative chassis that can form the support structure of a prefabricated building module.

FIG. 1A is an illustration of a representative chassis 100 that can form the support structure of a prefabricated building module. The chassis comprises rectangular front and rear portions 101, 102, each having a pair of vertical supports 105 and top and bottom horizontal supports 110. The front and rear portions 101, 102 are connected to each other with horizontal beams 115. The chassis can also have various other structural elements, such as posts or wall studs 120 and cross supports 125. Vertical supports 105 are hollow support structures (HSS) and can have a rectangular (including square), or other shape cross-section. A square cross-section is illustrated.

The various vertical supports 105, horizontal supports 110 and horizontal beams 115 are joined at each corner with a top connecting part 130 (for top chassis corners) or bottom connecting part 135 (for the bottom chassis corners). The connections of the horizontal supports and beams 110,115 to the connecting part 130, 135 can be made using conventional techniques. In the illustrated embodiment, the vertical supports 105 and horizontal supports 110 are connected to a respective top and bottom corner connecting parts 130, 135 using welds and the horizontal beams 115 are bolted in place at a joining assembly 137 such as a butt joint, shown in more detail in FIG. 1C. Other connection means could be used. Instead of a butt joint, a flange can extend from a corner connecting part 130 and be connected to a horizontal beam 115 in a bolted-together lap joint, shown in more detail in FIG. 1D.

In one configuration, the top and bottom connecting parts 130 are made of steel that is milled or cast into the proper configuration. The vertical supports are also steel. Vertical supports 105 can be provided, e.g., to a facility where the chassis are to be prefabricated, with the top and bottom connecting parts 130 already attached and the top and bottom ends of the assembly milled to create a flat bearing connection surface.

Figure 1B:
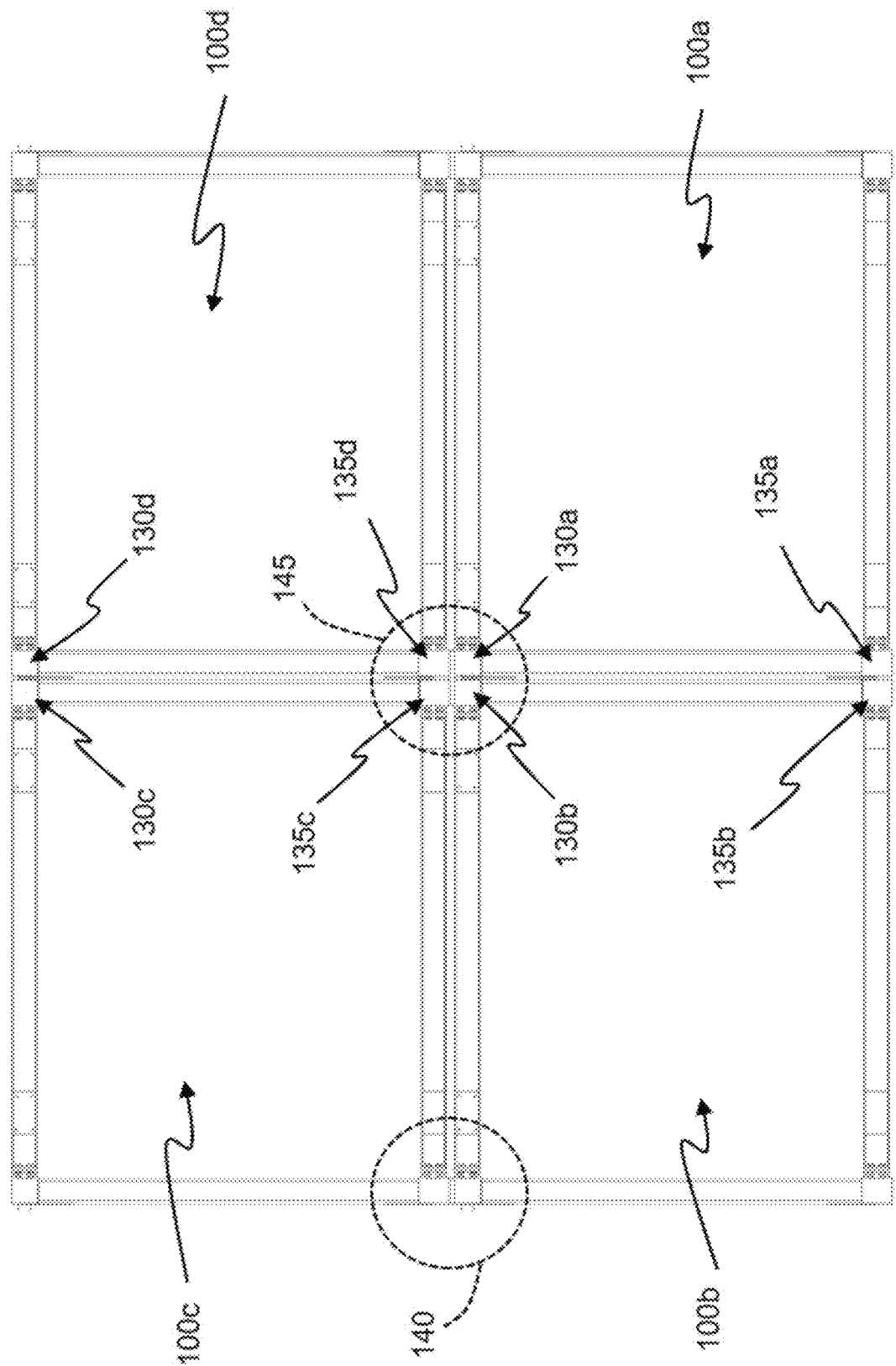
FIG. 1B is a diagram of four chassis stacked vertically and horizontally in a modular building configuration.
Figure 1C:
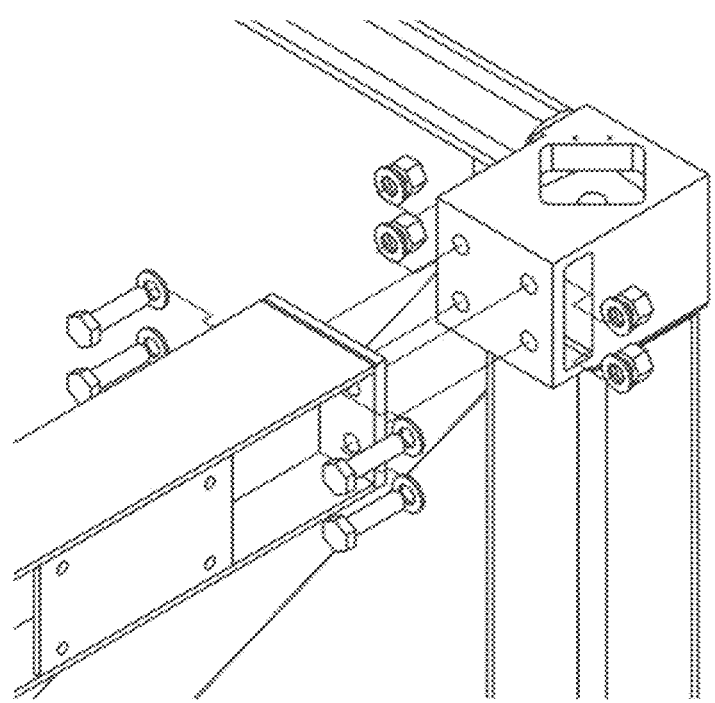
FIGS. 1C and 1D are views of different joining assemblies to attach the node to a horizontal support.
Figure 1D:
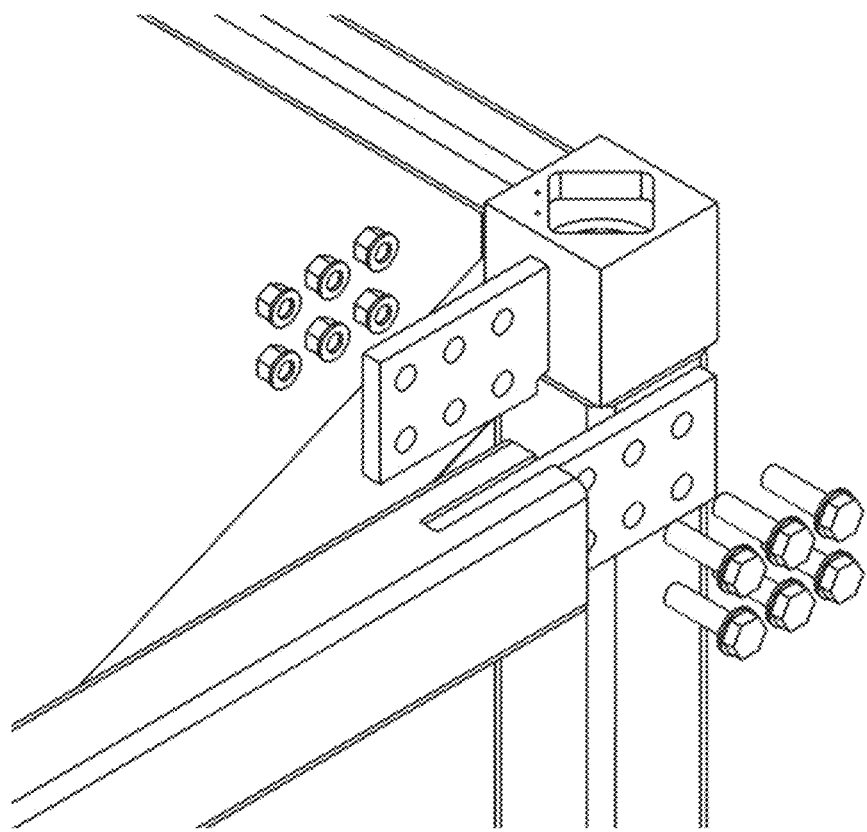

FIG. 1B is a diagram showing a side view of four chassis 100a, 100b, 100c, 100d stacked vertically and horizontally in a modular building configuration. During assembly of the building adjacent corner connecting parts are joined together to form connection nodes, such as nodes 140, 145. The number of horizontally and vertically adjacent corners in a given node depends on the arrangement of the modules. At a given node, both horizontally and vertically adjacent corners are attached to each other.

Figure 2:
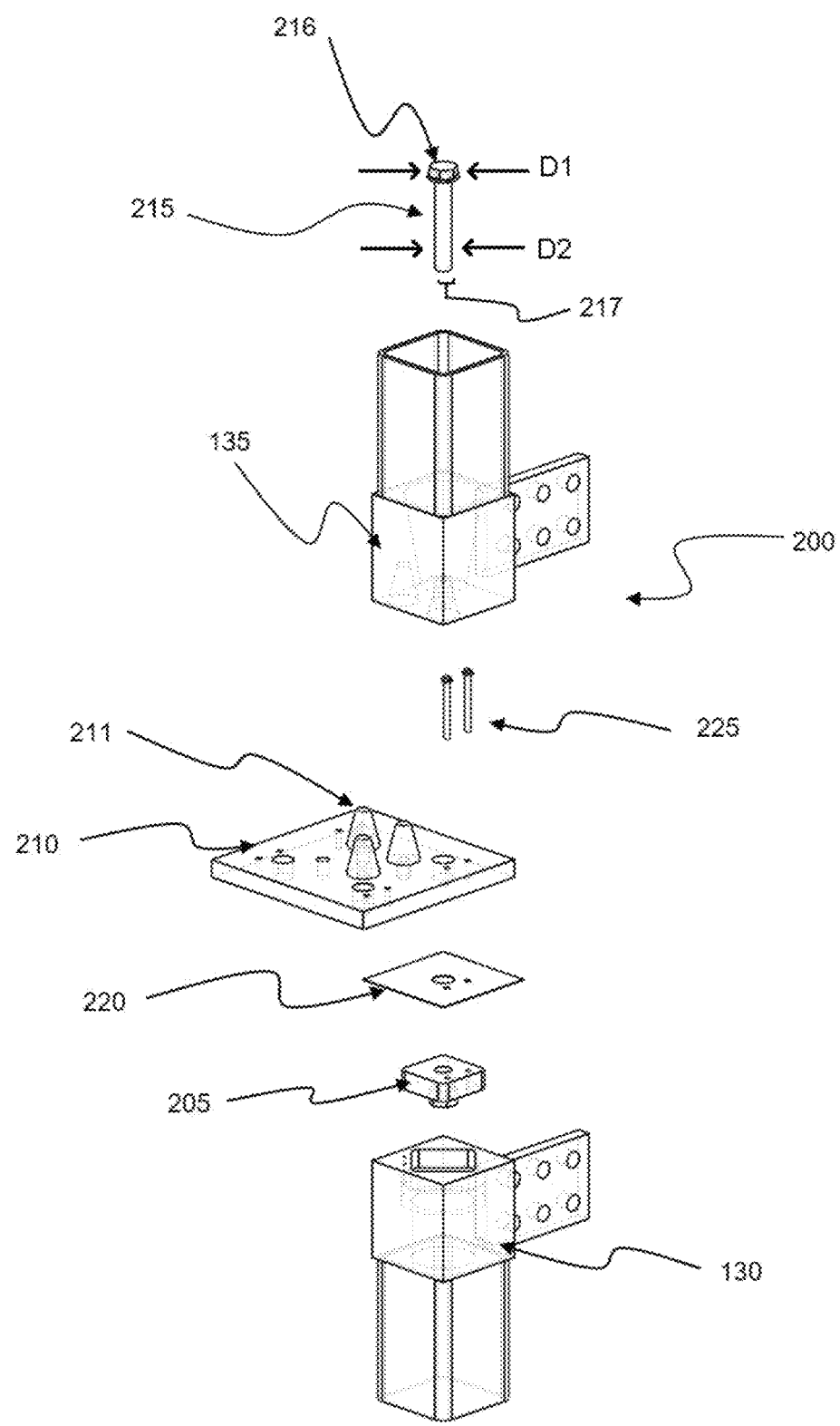
FIG. 2 is an exploded view of a connection node system according to aspects of the invention.

FIG. 2 is an exploded view of a connection node system 200 showing a top connecting part 130 and bottom connecting part 135 along with connecting hardware including a threaded coupler nut 205 (such as one having an integral threaded aperture or a separate captive threaded nut), a diaphragm plate 210, bolt 215, shims 220 and diaphragm temporary locking bolts 225. As discussed in more detail below, during construction the coupler nut is placed into and locked within connecting part 130. The diaphragm plate 210 is mounted over the top connecting part 130 and can be aligned and temporarily held in place with diaphragm locking bolts 225. The diaphragm plate 210 can be used to connect connecting part 130 to one or more adjacent connecting parts 130 from adjacent chasses 100 and different diaphragm plate configurations can be provided according to the number of corners at a node, such as two along the facade and four at an interior connection. The bottom connecting part 135 is attached to the top connecting part 130 using bolt 215.

Figure 3A:
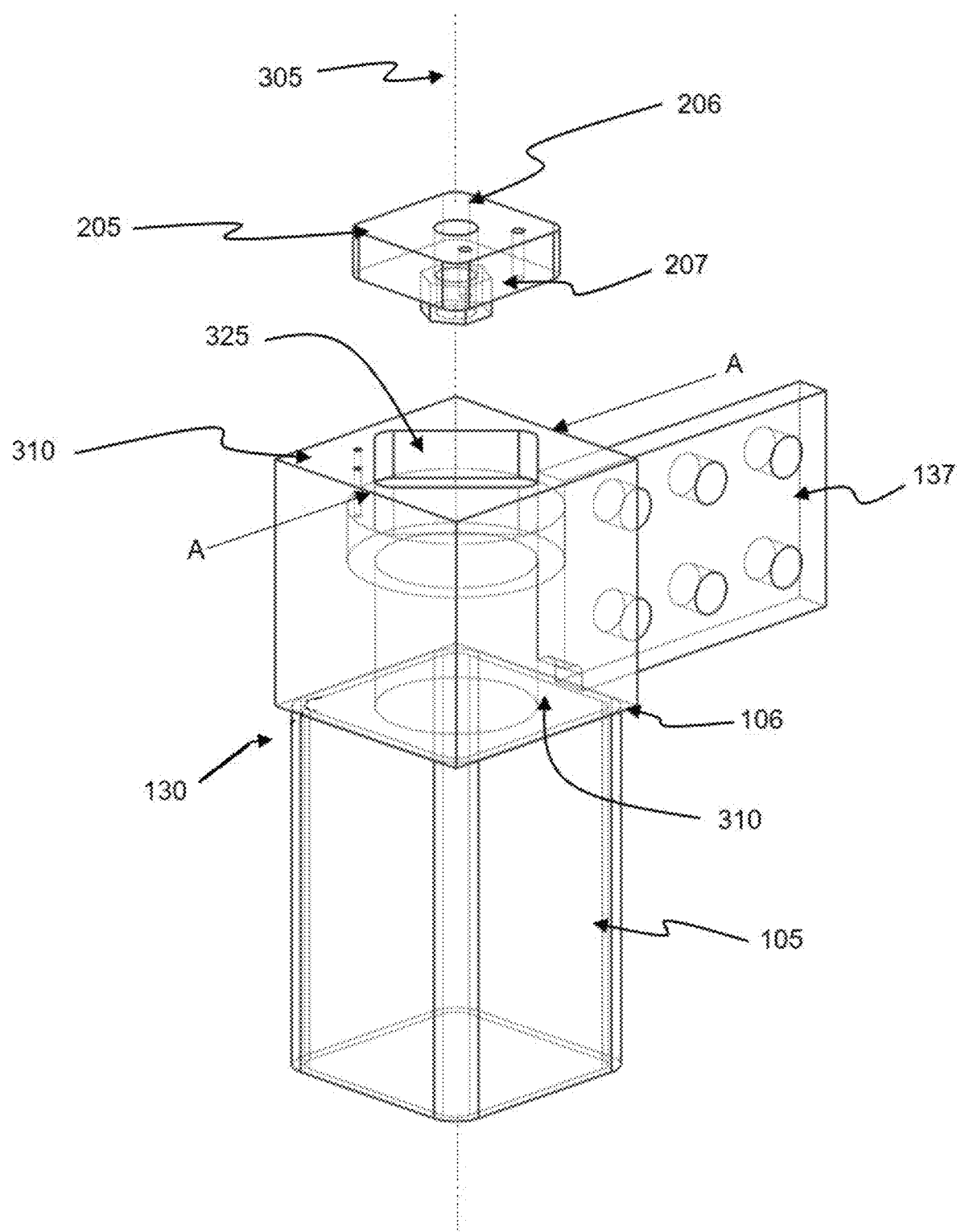
FIG. 3A is a detailed view of the top connecting part and coupler nut of the node connection system shown in FIG. 2.
Figure 3B:
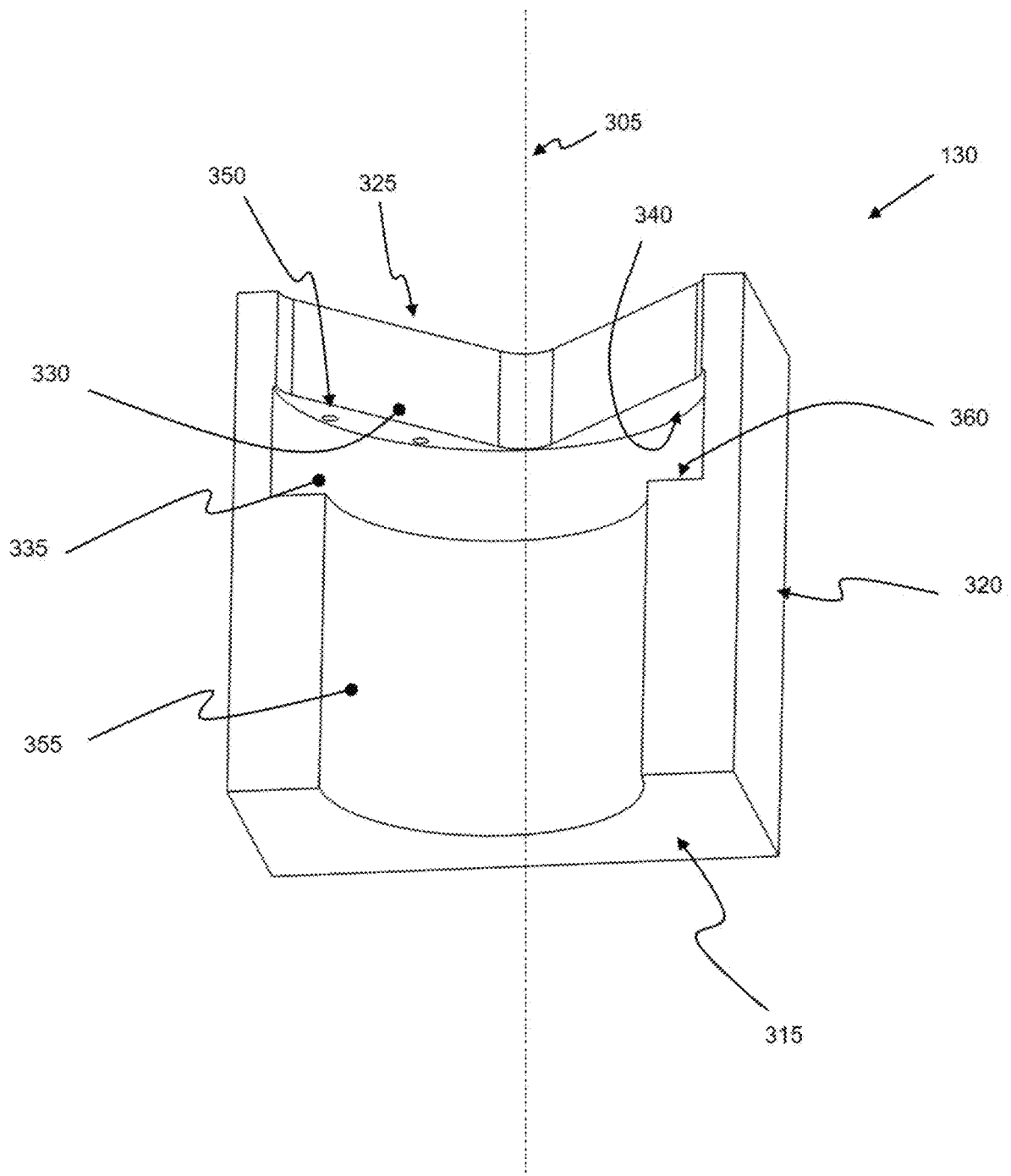
FIG. 3B is a cross section of the top connecting part of FIG. 3A along line A-A.

FIG. 3A is a more detailed view of the top connecting part 130 and coupler nut 205. FIG. 3B shows a cross section of the top connecting part 130 of FIG. 3A along line A-A. Top connecting part 130 is mounted at a top end 106 of a vertical support 105. In one configuration, the top connecting part 130 fits into the opening at the top end 106 of vertical support and can be welded or otherwise affixed into place. Other ways of joining the top connecting part 130 to the vertical support 105 can be used as well.

The top connecting part 130 has a top surface 310. Vertical support 105 defines a central axis 305. An axial hole 325 runs from the top surface 310 to the interior of the vertical support 105. Axial hole 325 is configured so that bolt 215 can pass completely through the top connecting part 130 and into the interior of the vertical support 105. In a particular embodiment, the axial hole 325 has a diameter throughout that is greater than the maximum diameter D of the head 216 of bolt 215 so the bolt 215 can be in any rotational orientation and still pass through top connecting part 130 into the vertical support 105. A narrower axial hole 235 could be provided if there is a need to prevent the bolt from passing into the vertical support unless it is in a correct rotational orientation.

The top connecting part defines a bottom surface 315 within the vertical support 105. Depending on the configuration of the top connecting could merge into the inner side walls of the vertical support 105 so that the bottom surface 315 is minimized (or absent entirely). Joining assembly 137 can comprise one or more flanges welded or otherwise affixed to respective sides 320 of the top connecting part 130 to allow attachment of horizontal supports. A flat mount for a butt joint or other connection structure could be provided instead.

The axial hole 325 has a first portion that is adjacent the top surface 310 and defines a first open area 330 into which the coupler nut 205 can be placed. A second portion of the axial hole defines a second open area 335 adjacent the first open area 330. The second open area 335 defines at least one shoulder 340 that is adjacent to the first open area 330. The coupler nut 205, first open area 330 and second area 335 are configured so that the coupler nut 205 when in an insertion position can pass through the first open area 330 and into the second open area 335 and can be rotated from the insertion position to a captured position where the shoulder 340 prevents removal of the coupler nut 205 through the first open area 330.

The coupler nut 205 has a triangular, square, or other angular or curved geometric shape with a horizontal diameter that is not the same along all azimuth angles. In the illustrated embodiment, the first open area 330 has substantially the same shape as the coupler nut 205 and is sized to allow the coupler nut 205 to be easily inserted without too much play. The second open area 335 has a circular cross section large enough to allow the coupler nut 205 to spin freely without too much play so that the aperture 206 in the coupler nut 205 remains substantially aligned with the central axis 305.

As discussed further below, the coupler nut is used for securing the top connecting part 130 to the bottom connecting part 135 in conjunction with the bolt 215. While the shape of the nut plate 205 and the first and second open areas 330, 335 can vary there is a balancing between increasing the surface area of the nut plate 205 that engages the shoulder 340 so that the assembly can withstand high forces involved in coupling chasses 100 together while also providing an opening large enough to allow easy access.

In a configuration where the vertical support 105 and coupler nut are both rectangular, the opening for the coupler nut can be rotated relative to the vertical support 105 cross section, such as between 30 and 60 degrees, and in an embodiment substantially at 45 degrees. In this configuration, the final locked position of the coupler nut 205 engages a comparatively large amount of metal within the top connecting part 130 and increases the stress resistance of the total node assembly. Other relative rotational positions can be used for the design, including no rotation, which may make it easier to fabricate the top connecting part 130 by casting or other means.

Different shapes of the coupler nut 205, first open area 330, and second open area 335 could be used as long as capture of the coupler nut 205 in the second open area 335 can be achieved as discussed herein. In addition, the coupler nut 205 can be a single integral unit with the threaded aperture 206 formed directly therein. Alternatively, the threaded aperture 206 can be provided by a captive bolt 207 formed separately from and connected to the coupler 205.

Figure 3C:
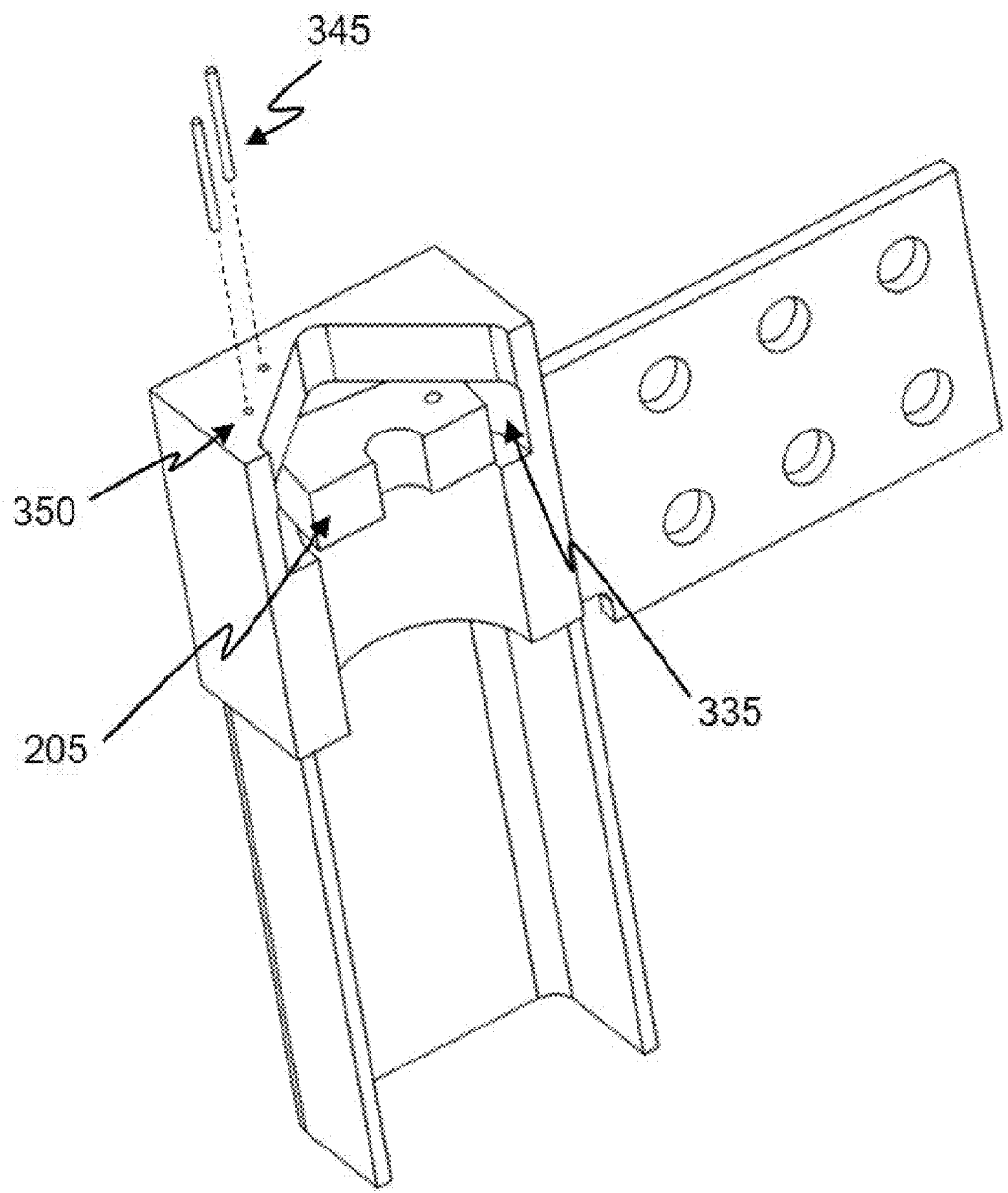
FIG. 3C is a cross section of the top connecting part of FIG. 3A with a coupler nut.

To retain the coupler nut 205 in the captured position, a locking pin 345 can be inserted through a coupler locking hole 350. The locking pin 345 extends into the second open area 335 and functions to restrict rotation of the coupler nut 205 from its captured position. FIG. 3C is a cross section of the top connecting part of FIG. 3A illustrating a seated coupler nut and locking pins 345. In the embodiment shown in FIG. 3C, two locking holes 350 are provided and positioned so that inserted locking pins 345 will bracket a corner of the coupler nut 205 and limit the amount the coupler nut can rotate so as to prevent its removal. In an alternative embodiment, locking holes 351 (not shown) can be formed in the coupler nut 205. The locking holes 350 are positioned so the locking pin 345 can pass into the locking holes 351 in the coupler nut.

Returning to FIG. 3B, a third open area 355 can be formed beneath the second open area 335. The third open area 355 defines shoulders 360 at the bottom of the second open area 335 that keep the coupler nut 205 within the second open area 335 so it does not fall into the vertical support 105. In the illustrated embodiment, the third open area 355 has a circular cross-section with a diameter that is less than the diameter of the second open area but greater than the diameter D of the bolt head 216.

Figure 4A:
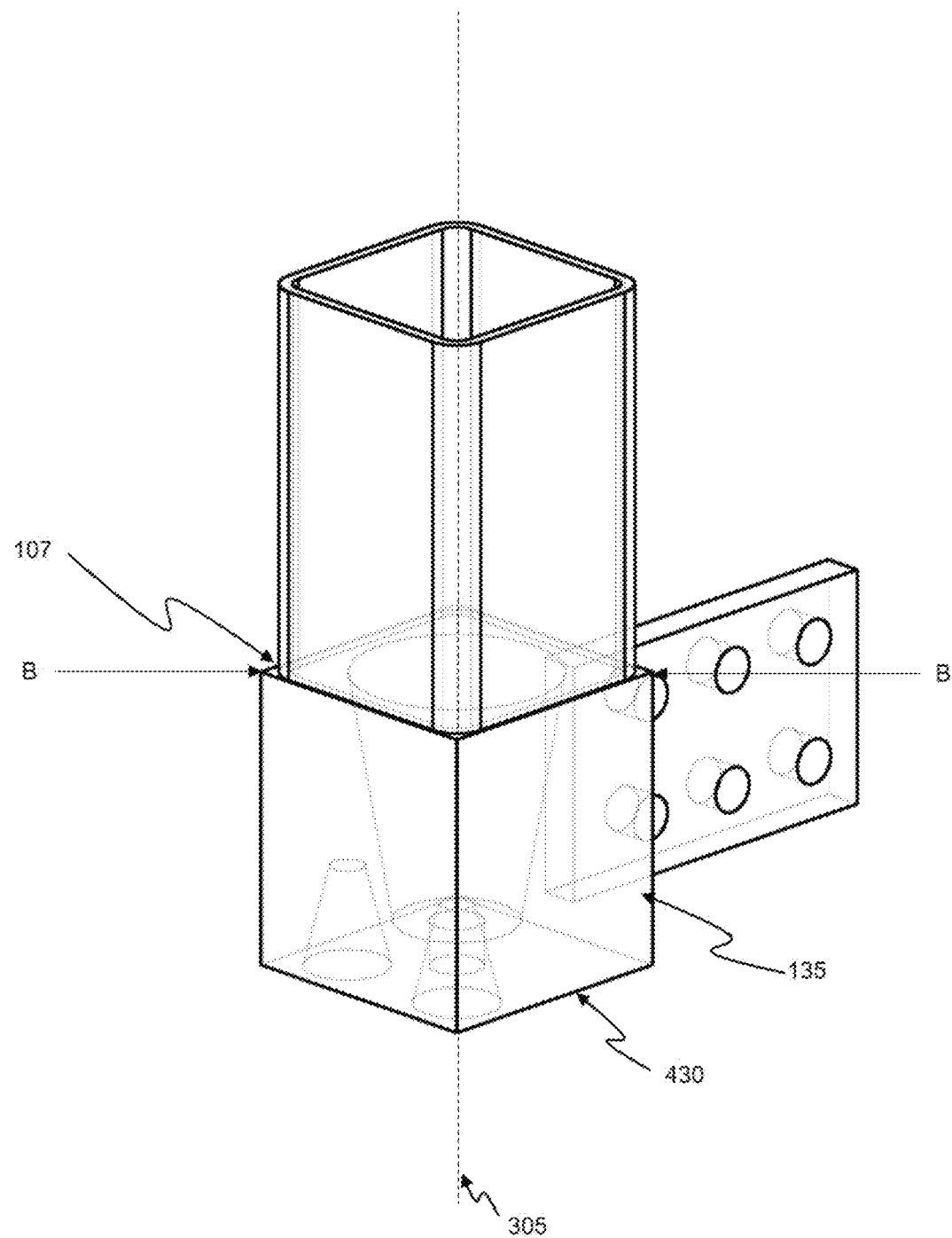
FIG. 4A is a detailed view of the bottom connecting part of the node connection system shown in FIG. 2.
Figure 4B:
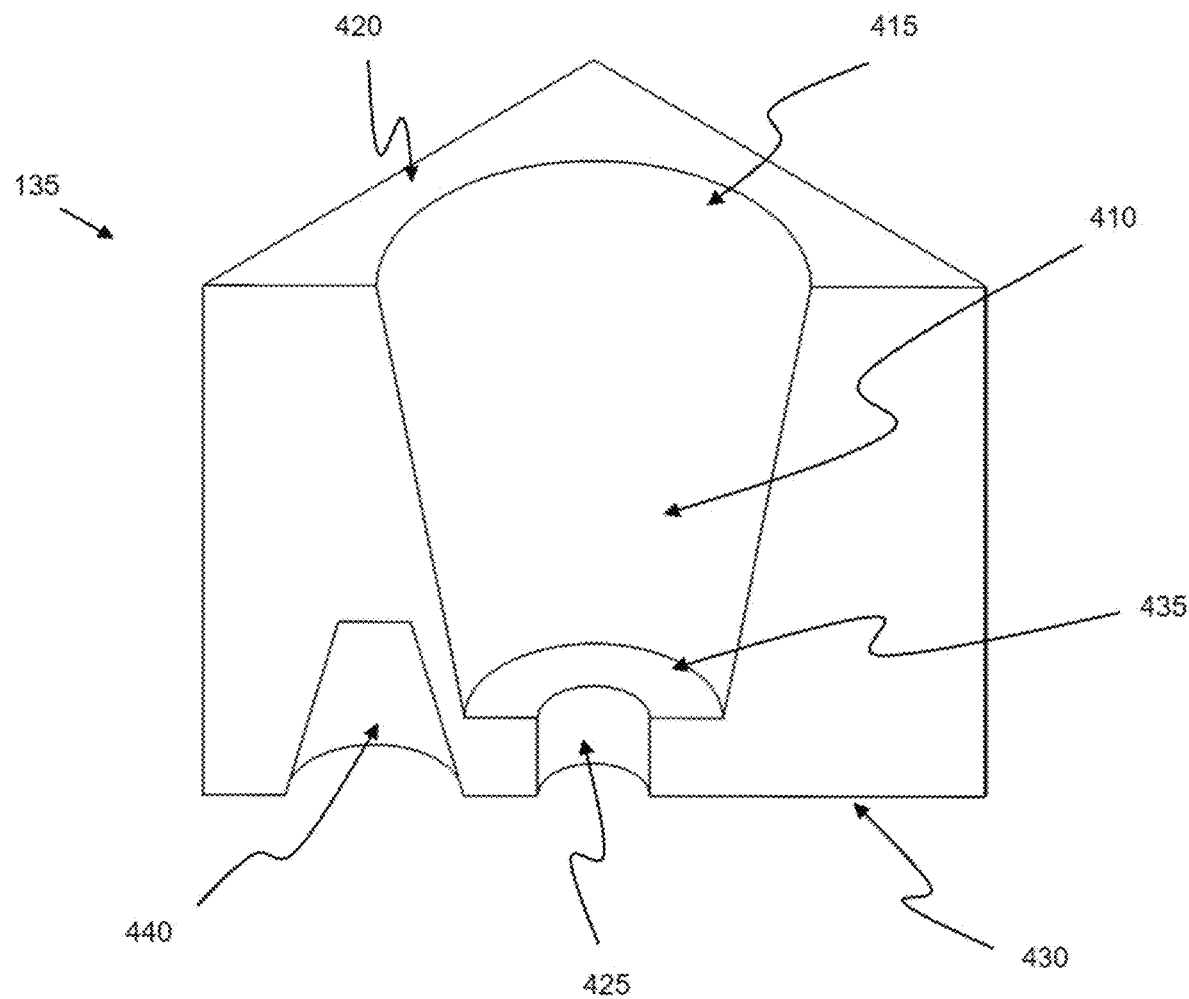
FIG. 4B is a cross section of the bottom connecting part of FIG. 4A along line B-B.

FIG. 4A is a more detailed view of the bottom connecting part 135. FIG. 4B shows a cross section of the bottom connecting part 135 of FIG. 4A along line B-B. Bottom connecting part 135 is mounted at a bottom end 107 of a vertical support 105 (shown in phantom in FIG. 4A). In one configuration, the bottom connecting part 135 fits into the opening at the bottom end 107 of vertical support 105 and can be welded or otherwise affixed into place. Other ways of joining the bottom connecting part 135 to the vertical support 105 can be used as well.

With reference to FIGS. 4A and 4B, bottom connecting part 135 has a bore 410 that extends through it along a central axis. The bore 410 has an upper bore part opening 415 at a top 420 of the bottom connecting part 135 and a lower bore part opening 425 that opens at the bottom 430 of the bottom connecting part 135. The diameter of the bore 410 at the upper opening 415 is greater than the bolt head 216 diameter D1 and the bore diameter throughout is greater than the diameter D2 of the shank 217 of bolt 215. Between top and bottom of the bore 425 is a constricted area through which the bolt shank 217 but not the bolt head 216 can pass.

In the illustrated embodiment, the upper bore part is conical and ends at a shoulder 435 on which the head 216 of the bolt 215 can rest when the bolt 215 is inserted into the bottom connecting part. The lower bore part is cylindrical with a diameter large enough to allow the bolt shank 217 to pass through easily and to provide sufficient clearance to accommodate normal fabrication, assembly, and erection tolerances, but to also maximize the contact area under the head of the bolt. Various other configurations of the upper and lower bore parts 415, 425 are possible. For example, the diameter of the bore 410 from the upper opening 415 to the shoulder 435 can be constant.

An alignment opening 440 can be provided in the bottom surface 430 and be configured to receive an alignment member 211 extending upwards from the diaphragm plate 210 during assembly of the connection node. The alignment opening 440 and alignment member 211 help to properly align the bottom connecting part 135 with the diaphragm plate and the top connecting part 130 in a lower chassis to which the diaphragm plate is connected. More than one alignment opening 440 can be provided. For example, multiple alignment openings 440 can be provided to allow the same bottom connecting part 135 to mount to a diaphragm plate 210 on the left or on the right.

Figure 5A:
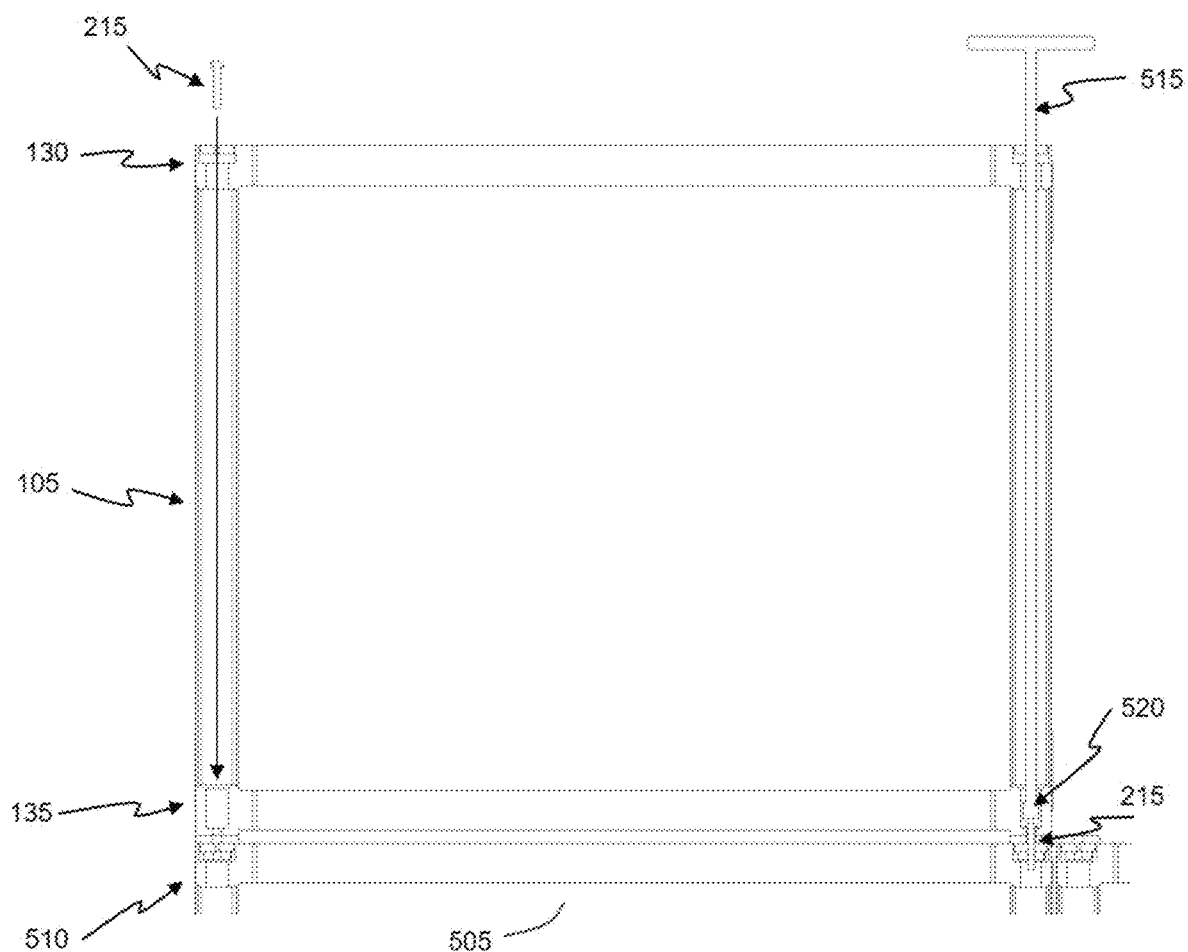
FIGS. 5A-5C illustrate a method for joining chassis in a modular building using the connection node assembly of FIG. 2.
Figure 5B:
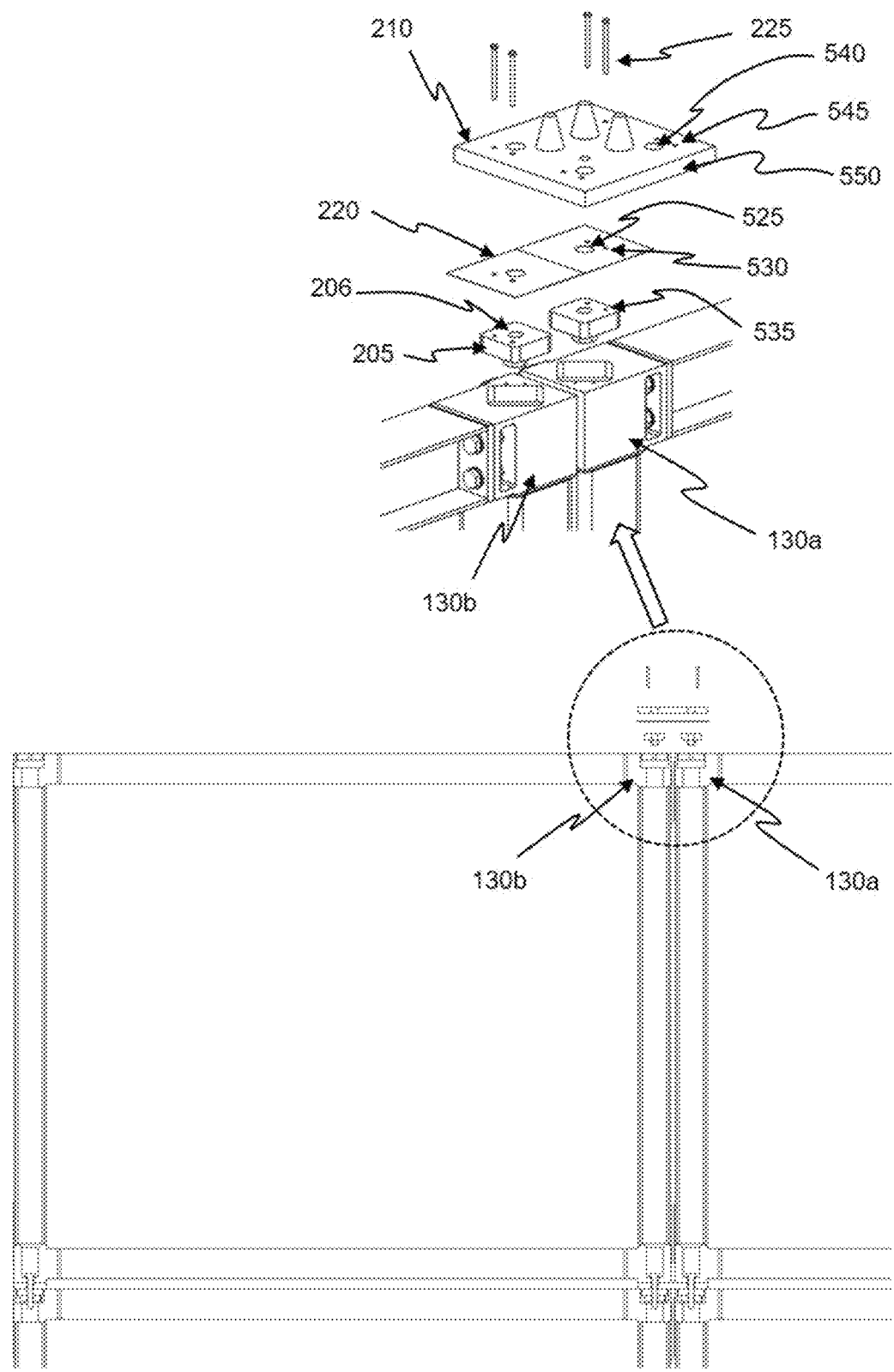
Figure 5C:
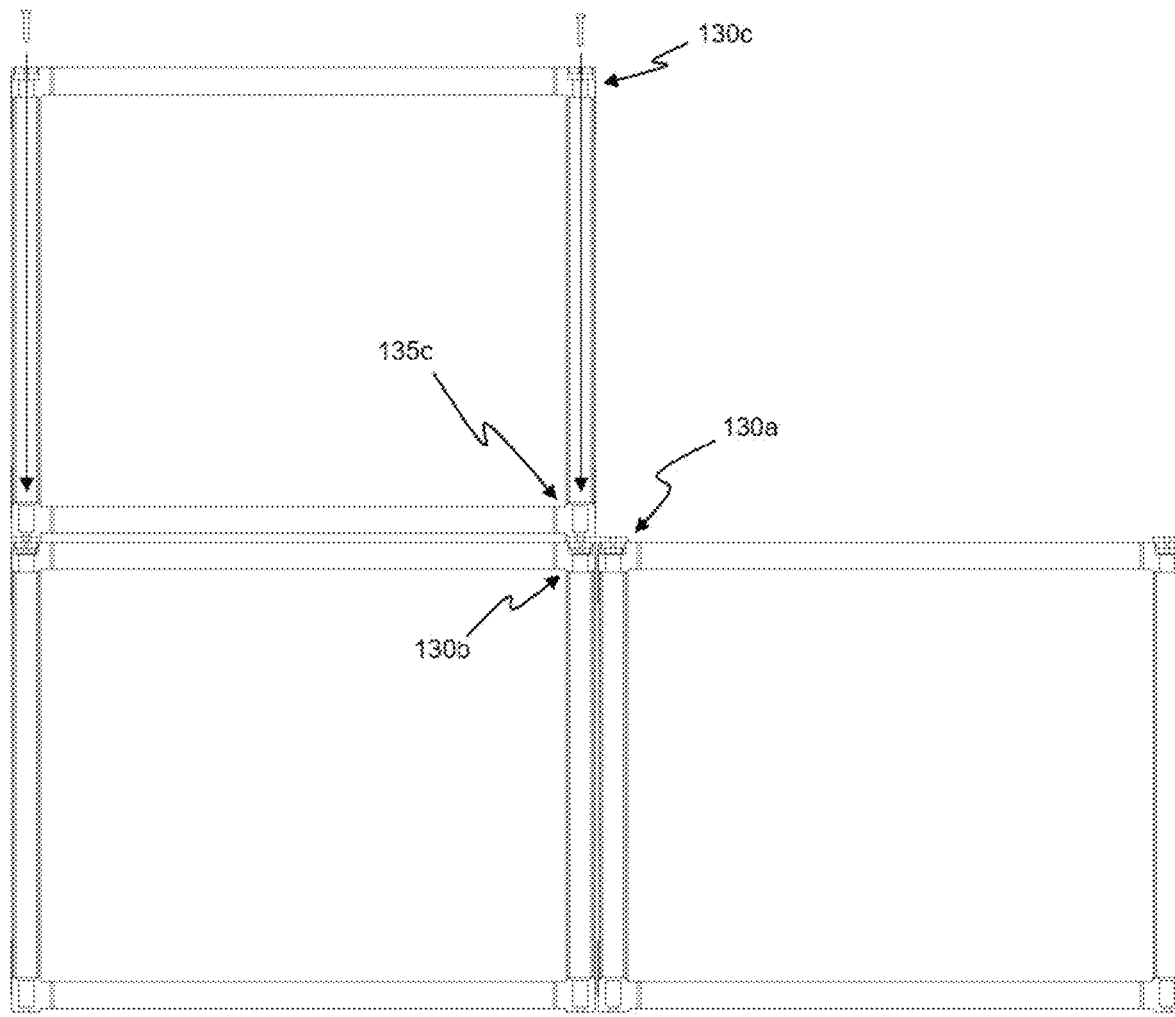

FIGS. 5A-5C illustrate a method for joining chassis in a modular building using the connection node assembly. FIG. 5A shows a first chassis mounted to a foundation 505. The foundation 505 has mounting points 510 to which the bottom connecting parts 135 of the chassis can be joined. The mounting points 510 can be modified versions of a top connecting part 130 or have another configuration for receiving bolt 215. FIG. 5A shows an already assembled chassis 100. It should be appreciated that the vertical support 105 with the top connecting part 130 and bottom connecting part 135 already connected can be provided as a single part for use during construction of a chassis 100.

Because of the unique configuration of the connection node system, once the chassis is aligned over the mounting points 510 it can be fixed in place without requiring a worker at the base of the chassis or inside of the chassis. Bolt 215 is dropped or otherwise lowered through the central bore 410 of the top connecting part 130. It passes through the hollow vertical support 105 and is captured by the bore 410 in the bottom connecting part 130. An elongated wrench assembly 515 can be inserted through the top connecting part 130 and lowered through the vertical support 105 until the socket 520 at the end of the wrench seats on the head of 216 of the bolt. Wrench assembly 515 is then used to tighten the bolt 215 and secure the chassis in place on the foundation 505. In an alternative embodiment, the bolt could be pre-inserted into the central bore before the chassis is lifted into place and temporarily held in place with wax, hot glue, or other similar substance.

FIG. 5B illustrates the connection of two adjacent top connecting parts 130a, 130b from horizontally adjacent chassis. A respective coupler nut 205 is mounted and locked into place as discussed above. The diaphragm plate 210 is then positioned over the top connecting parts 130a, 130b. One more leveling shims 220 can be added to adjust the vertical height of the diaphragm plate 210. The diaphragm plate and shims have bolt apertures 540, 525 through which a bolt 215 will later pass. To help align the aperture 540, 525 with the aperture 206 in the coupler nut 205, one or more alignment holes 545, 530 are formed on the diaphragm plate 210 and shim 220 respectively. One or more corresponding alignment holes 535 are formed on the coupler nut 205. When the coupler nut 205 is locked in place and the shim 220 and diaphragm plate 210 are properly positioned, the alignment holes 545, 525, 535 will be aligned. At this point locking bolts 225 can be inserted through holes 545, 525, 535 and serve to lock the diaphragm plate 210 and shim 220 in the proper place over the coupling nut 205. A temporary bolt (not shown) can also be passed through the bolt apertures 540, 525, 535. The position of a secured diaphragm plate can be surveyed to allow for repositioning of each floor to the building nominal coordinate system.

According to a particular method, when joining two adjacent top connecting parts 130a, 130b, the locking bolts 225 and temporary bolt are installed over only one top connecting part, such as 130a. Once a portion of the diaphragm plate 210 is secured to one chassis, such as chassis 130b, by the placement of another chassis above it (see FIG. 5C), the diaphragm plate 210 will then be held securely in place and the locking bolts 225 and temporary bolt can be removed so the locking bolts 225 do not interfere with the placement of the next chassis coming in. The temporary bolt also functions to close the main opening in the top connecting part to prevent water from getting into the hollow vertical support 105 if construction is occurring during wet weather. The bolt apertures 545 that receive the locking bolts 225 can have a diameter large enough to allow the locking bolts 225 to float in the holes to allow for misalignment. If misalignment is less of a concern, locking bolts 225 could be counterbored into the diaphragm plate 210 so removal is not needed.

The diaphragm plate 210 can be shaped and sized according to the number and arrangement corners of a chassis to be joined at the node. In an embodiment, the diaphragm plate 210 is configured so that it fully covers the top surfaces 310 of the top connecting parts 130 at the node and where the sides 550 of the diaphragm plate 210 are generally aligned with the exterior sides of the top connecting parts at that node. (See FIG. 7 discussed further below.)

Figure 8:
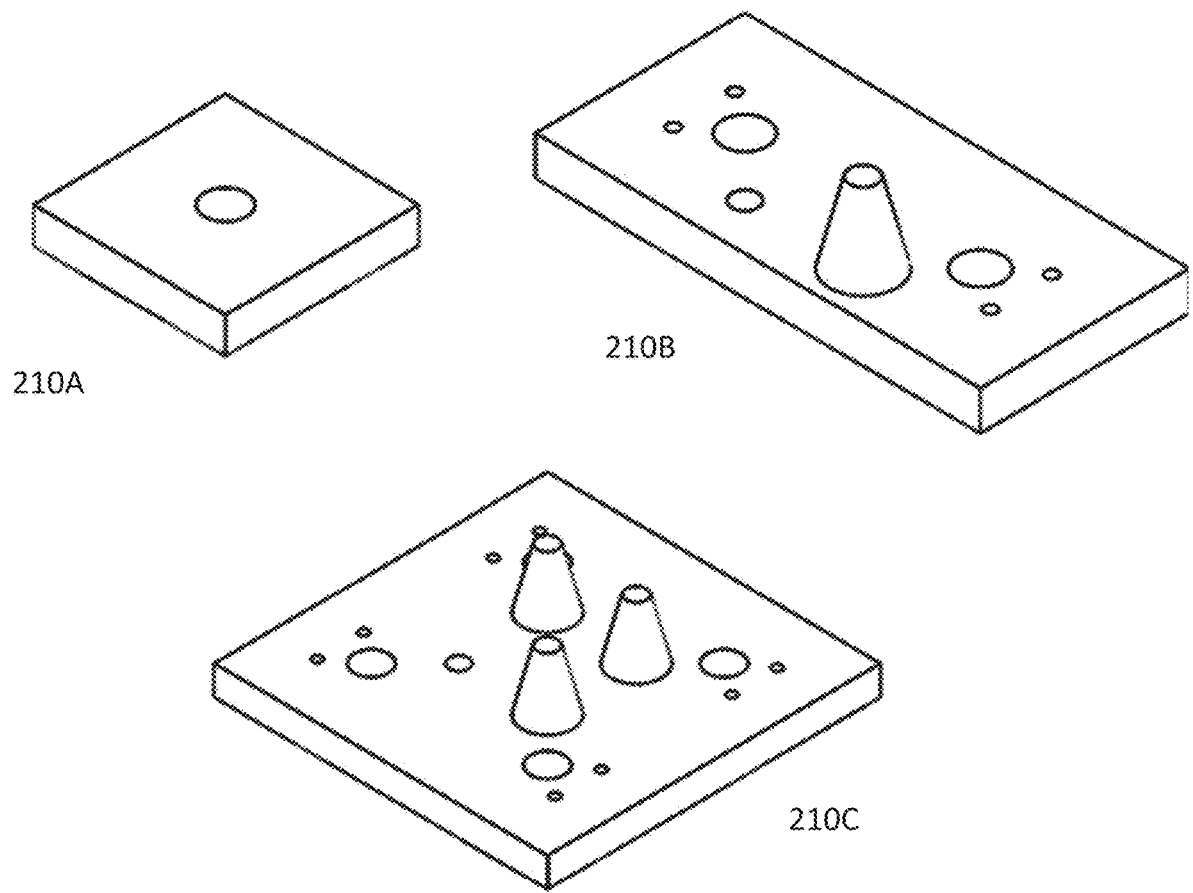
FIG. 8 illustrates various different diaphragm plate configurations.

The configuration of the alignment members can vary in different diaphragm plates 210 according to where in the structure the node is located and the stacking sequence of the chassis. In an embodiment, close fit cones are placed on the diaphragm plates used near the façade portions of the chassis to tightly control the position of the chassis in that area. Diamond cones are used on diaphragm plates at the other end of the chassis to control the rotation of the chassis. Depending on the stacking sequence and position, a given diaphragm plate can have anywhere from zero to four alignment members. Various different diaphragm plate configurations 210a, 210b, 210c are shown in FIG. 8. Differently configured alignment members known to those of ordinary skill in the art can be provided to, for example, position the chassis in x/y or manage rotation of the chassis about the alignment cone. The alignment members can be integrally formed with the diaphragm plate or the diaphragm plate can have suitable mounting apertures and the appropriate alignment members installed separately.

Figure 5D:
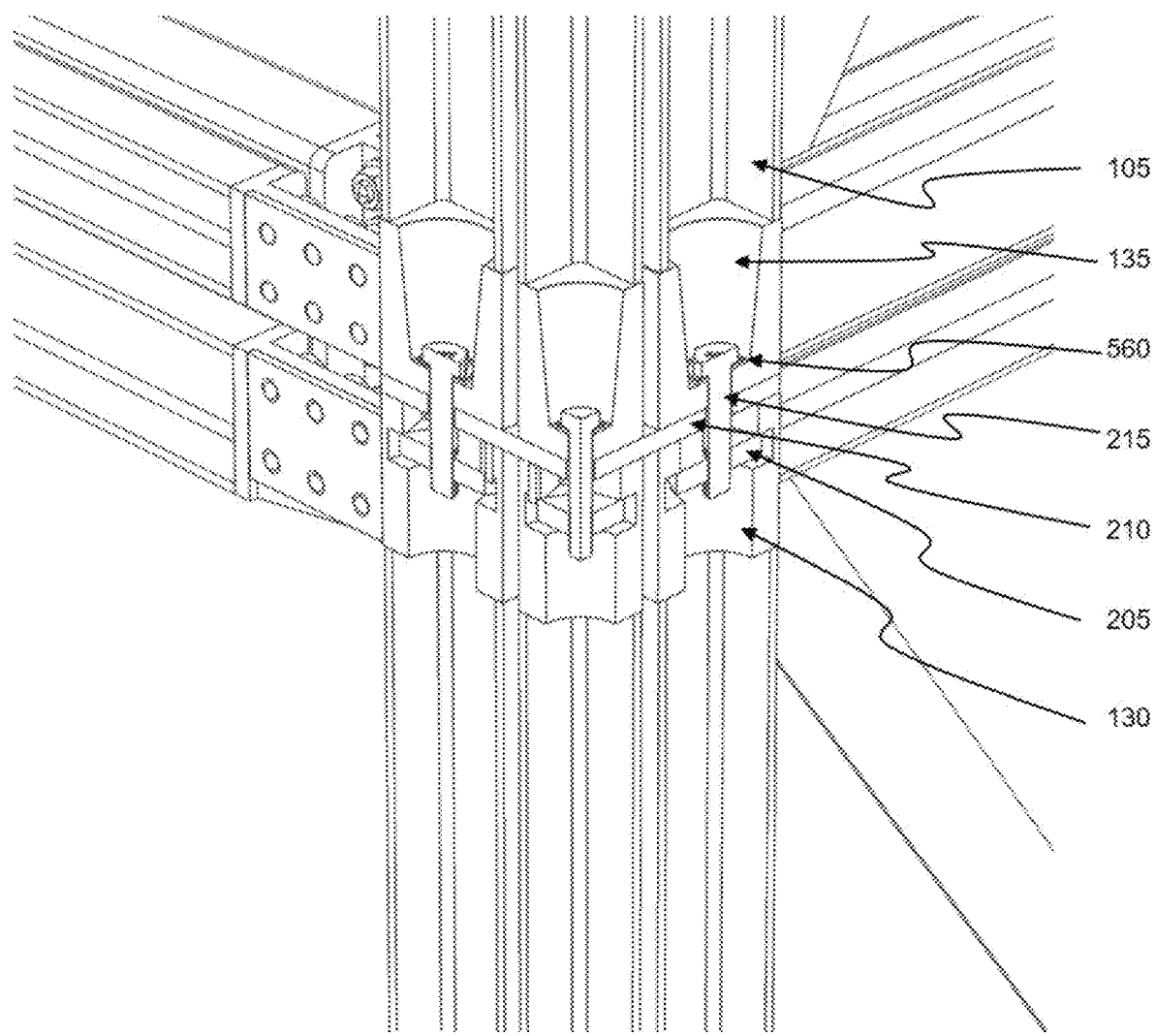
FIG. 5D shows a cross section view of a fully connected node assembly at an inner node where upper and four lower chasses come together.

FIG. 5C shows the installation of a third chassis over one of the chassis shown in FIG. 5B. With reference to FIG. 5C and FIG. 2, an upper chassis is lifted into place, its lower corners are generally aligned with the top corners of the chassis below, and then the chassis is lowered into place. One or more alignment members 211 on the diaphragm plate 210 mate with the corresponding alignment opening 440 at the bottom of bottom connecting part 135 to guide the upper chassis into proper alignment so that the central axis of the vertical supports 105 in the upper and lower chassis are aligned. FIG. 5D shows a cross section view of a fully connected node assembly at an inner node where upper and four lower chasses come together.

Figure 6A:
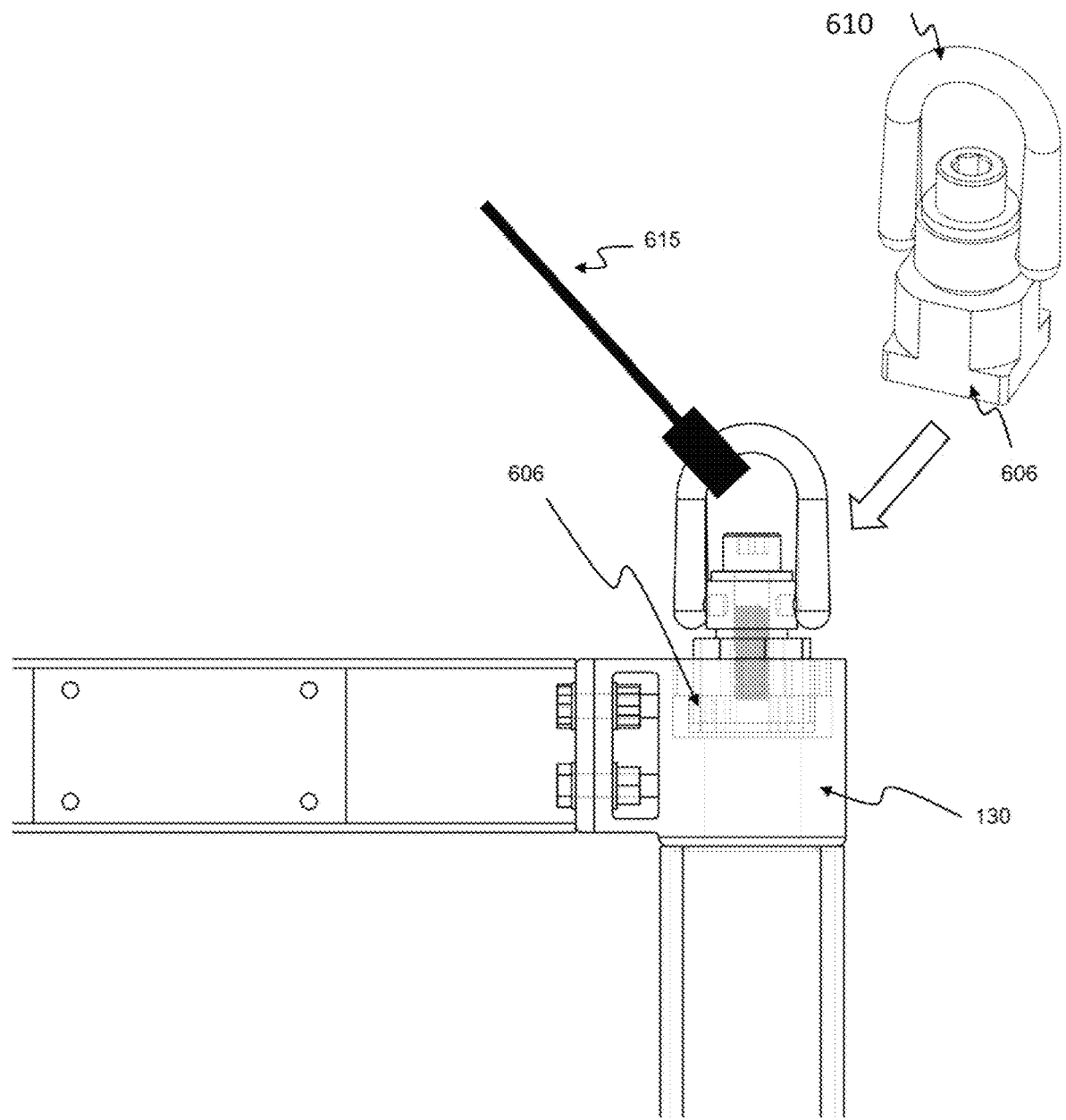
FIGS. 6A-6B illustrate use of a temporary nut plate in a top connecting part to provide lifting points of a chassis.
Figure 6B:
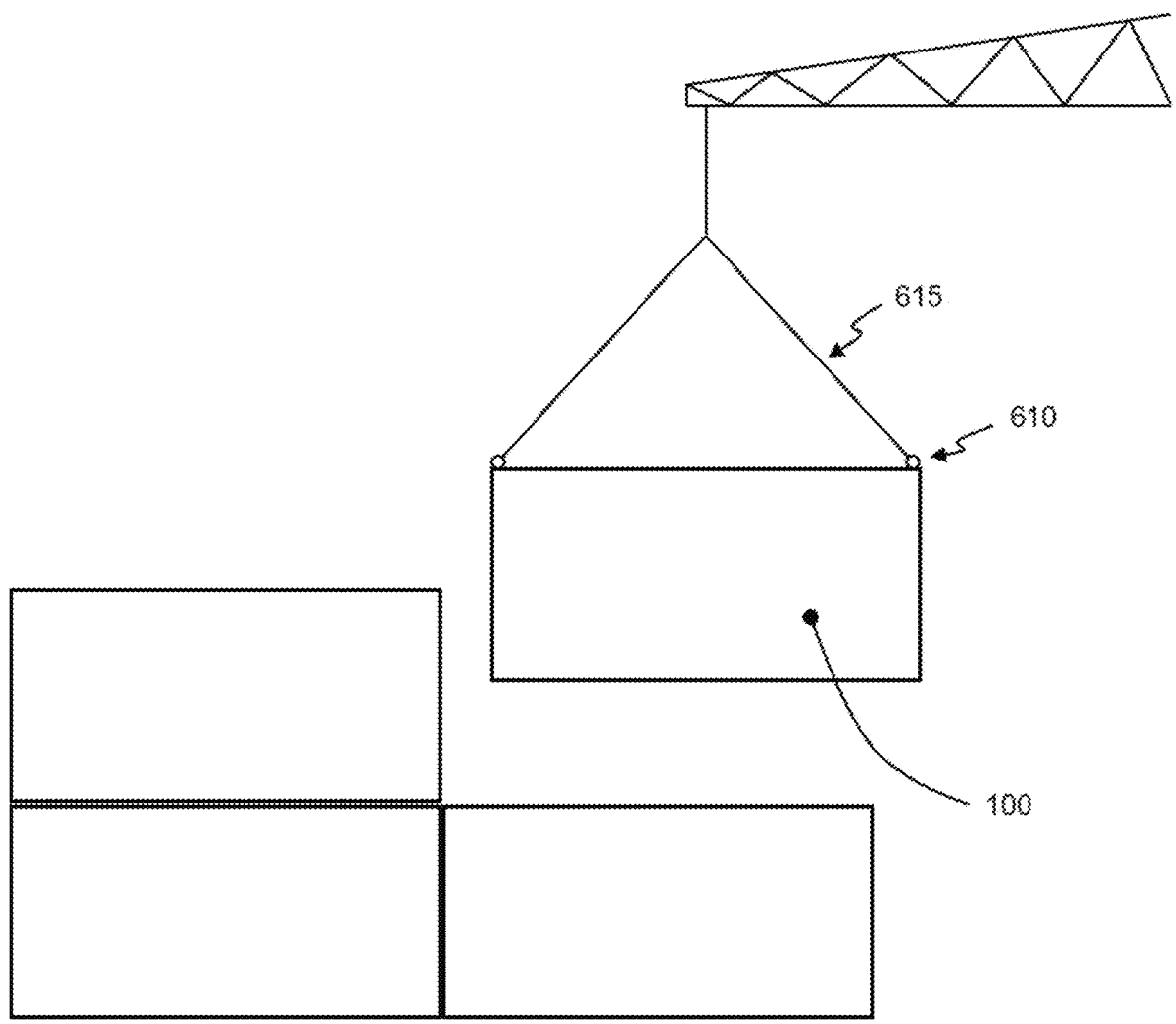

According to a further feature, and as shown in FIGS. 6A and 6B, a lifting plate 606 having a lifting eye 610 can be locked into the top connecting parts 130 in each corner of the chassis. The lifting plate has the same cross sectional shape as the coupler nut 205 and can be secured to the top connecting part in the same manner. Cables 615 can be connected to the lifting eyes for use in lifting the chassis into place. After placement, the substitute nut plate 606 can be removed. FIG. 6A shows one corner of a chassis 100 connected for lifting in this manner.

Returning to FIG. 5C, after the upper and lower chassis are aligned, bolts 215 can be inserted into the top connecting parts in the upper chassis, such as top connecting part 130c. The bolt 215 passes through the respective bottom connecting part 135 and engages the threaded aperture 206 in the coupling nut 205 mounted therein. The bolt 215 is then tightened using the elongated wrench assembly 515 (see FIG. 5) to couple the top and bottom connecting parts 130, 135 at each corner together. The bolted connection turns individual module columns connected along a vertical axis into continuous steel columns from the bottom to the top of the building. The bolted connect also clamps the diaphragm plate 210 between the chassis' columns and creates a tying load path laterally between all columns in the group. Once a portion of the diaphragm plate 210 is clamped between one pair of chasses 100, any temporary bolts used to hold the diaphragm plate 210 in place over the top connecting parts 130 of other chassis 100 can be removed.

Figure 7:
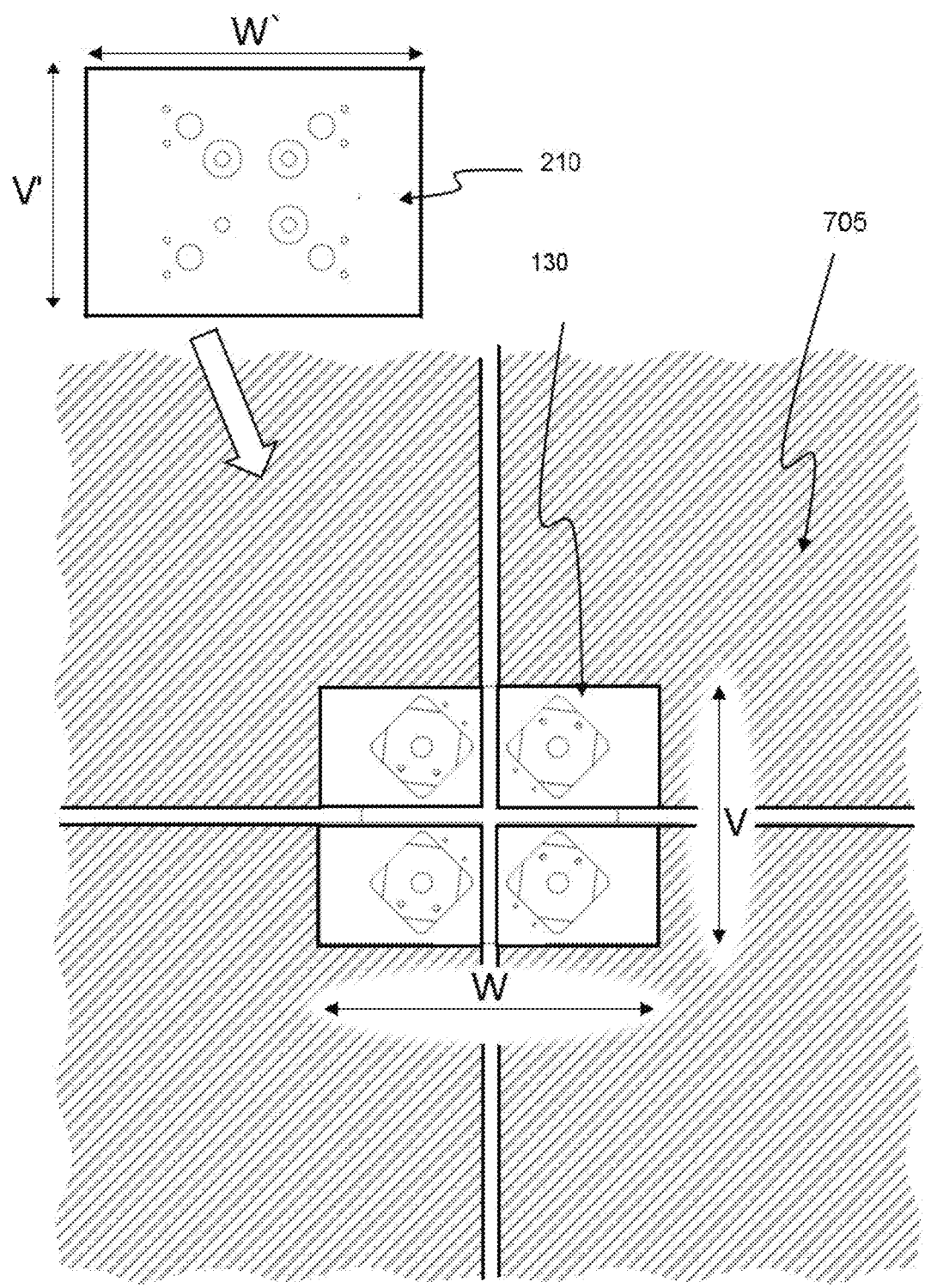
FIG. 7 illustrates the top of four adjacent chassis prior to installation of the diaphragm plate thereon.

Advantageously, disclosed node system 200 allows node horizontal and vertical chassis to be coupled to each other with only the top connecting parts 130 of each chassis 100 being exposed on the top 705 of an otherwise weather sealed chassis, such as shown in FIG. 7 which illustrates the top of four adjacent chassis prior to installation of the diaphragm plate 210. Once multiple modules are stacked, the nodes will define a rectangle having dimensions W by V. The diaphragm plate 210 which is used in this configuration will generally be a rectangle having dimensions W' by V' where W' is substantially equal to or less than W and V' is substantially equal to or less than V so that the entire top surface of the vertical supports will be covered. The vertical diaphragm plate could also be sitting in a recess rather than proud of the fireproofing and weatherproofing. Such a recess can be formed by using vertical supports 105 that do not extend fully to the top of the horizontal supports.

Advantageously, the top of the chassis (apart from the top connecting parts) and any weather barrier formed on the top can remain undisturbed and the risk of water or other contaminants entering the interior of the chassis from the top reduced or avoided entirely.

In addition, the entire assembly can be done from the top of each chassis. Workers are not required to access any internal portions of the chassis, thereby limiting the possibility for internal damage and reducing worker risk.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A connection node system for use in joining hollow supports of building modules, each support having a respective central axis, top and bottom ends, wherein vertically adjacent vertically oriented supports are joinable using a respective bolt having a threaded shank with a shank diameter and a head with a head diameter greater than the shank diameter, the bolt engagable with a coupler having a threaded aperture therein, the connection node system for a respective vertical support comprising:
   a first connection part at the bottom end of the vertical support and a second connection part at the top end of the vertical support;
   the first connection part comprising:
      respective top and bottom surfaces; and
      a bore having a diameter and extending along respective central axis from a first opening in the top surface of the first connection part to a second opening in the bottom surface of the first connection part, the diameter of the bore at the first opening being greater than the bolt head diameter, a shoulder within the bore between the first opening and the second opening reducing the bore diameter to less than the bolt head diameter, the bore diameter between the shoulder and the second opening being greater than the shank diameter;
   the second connection part comprising:
      respective top and bottom surfaces;
      an axial hole running from the top surface to the bottom surface and having a diameter throughout greater than the head diameter of the bolt, a first portion of the hole being adjacent the top surface and defining a first open area into which the coupler can be placed, a second portion of the axial hole adjacent the first portion and defining a second open area into which the coupler can be moved from the first open area, the second open area defining at least one shoulder adjacent the first open area and shaped to permit rotation of the coupler around the central axis from an insertion position to a captured position wherein the shoulder prevents removal of the coupler from the second open area;
   wherein a first connection part in a first vertical support can be connected to a second connection part in a second vertical support axially aligned with and beneath the first vertical support by the bolt seated in the first connection part bore with the shank passing therethrough and threadedly engaged with the coupler in the captured position in the second open area of the axial hole in the second connection part.

2. The connection node system of claim 1, the second connection part further comprising a first coupler locking hole in the respective top surface and extending through to the second open area, wherein when a first locking pin is inserted into the first coupler locking hole, the first locking pin restricts rotation of the coupler when the coupler is in the captured position within the second open area.

3. The connection node system of claim 2, the second connection part further comprising a second coupler locking hole in the respective top surface and extending through to the second open area, wherein when the first locking pin is inserted into the first coupler locking hole and a second locking pin is inserted into the second coupler locking hole, the first and second locking pins capture a portion of the coupler when the coupler is in the captured position within the second open area thereby restricting rotation of the coupler within the second open area.

4. The connection node system of claim 1, wherein the coupler has a rectangular profile, the first open area having four inner sides substantially parallel to the central axis and defining a rectangular open area into which the coupler can pass.

5. The connection node system of claim 1, the second connecting part having four outer sides substantially parallel to the central axis and defining a rectangular circumference, each outer side adjacent a respective inner side of the first open area, the rectangular open area rotated relative to the rectangular circumference so that adjacent outer and inner sides are not parallel.

6. The connection node system of claim 5, wherein adjacent outer and inner sides of the second connecting part have an angle of between 30 and 60 degrees.

7. The connection node system of claim 1, the first connecting part further comprising at least one alignment opening in the first connecting part bottom surface and configured to receive an alignment member extending upwards from a generally planar diaphragm plate when the first connecting part is lowered onto the diaphragm plate.

8. The connection node system of claim 7, further comprising the coupler and the diaphragm plate;
   the diaphragm plate having a top surface with the alignment member extending upwards therefrom and having a bolt aperture passing from the top surface to a bottom surface of the diaphragm plate and having a diameter greater than the shank diameter;
   wherein the diaphragm plate can be positioned between the first connection part of the first vertical support and the second connection part of the second vertical support with the alignment member engaged in the alignment opening and the bolt aperture is axially aligned central axis of the first vertical support and the central axis of the second vertical support.

9. The connection node system of claim 7, the diaphragm plate having a diaphragm alignment hole formed therein, the coupler having a coupler alignment hole formed therein,
   The diaphragm alignment hole and coupler alignment hole positioned on the diaphragm plate and coupler respectively so that when the coupler is in the captured position in the second connection part the diaphragm plate can be positioned over the second connection part with the diaphragm alignment hole and coupler alignment hole axially aligned and the bolt aperture axially aligned with the axial hole in the second connector part.

10. A method for assembling a structure comprising the steps of:
   providing a plurality of building modules, each module having a hollow vertical support wherein vertically adjacent supports are joinable using a bolt having a threaded shank with a shank diameter and a head with a head diameter greater than the shank diameter, each vertical support having a respective central axis, top and bottom ends, and comprising (i) a first connection part at the bottom end of respective vertical support having a bore therein along the central axis and having a first opening with a diameter greater than the bolt head diameter and adjacent an interior of the respective vertical support, and a second opening adjacent the bottom of the respective vertical support and having a diameter greater than the shank diameter but less than the bolt diameter, wherein the bolt can pass partially through the bore, and (ii) a second connection part at the vertical support top end, the second connecting part having an axial hole running from the top surface to the bottom surface and having a diameter throughout greater than the head diameter of the bolt and a downward facing shoulder therein, the axial hole configured to permit rotation of a coupler around the central axis from an insertion position to a captured position wherein the shoulder blocks removal of the coupler;

placing a first lower module;

securing a first coupler in the captured position within the axial hole in the second connection part of the vertical support of the first lower module, the first coupler having a threaded aperture therein;

placing a first upper module above the first lower module so that the vertical support of the first lower module and the vertical support of first upper module are substantially axially aligned;

inserting a first bolt through the second connection part of the vertical support of the first upper module and into the bore of the first connection part of the vertical support of the first upper module, wherein the shank of the bolt extends to the first coupler threaded aperture; and tightening the first bolt with a wrench assembly inserted through the second connection part of the vertical support of the first upper module.

11. The method of claim 10, further comprising the steps of, prior to placing the first upper module:

placing a second lower module horizontally next to the first lower module so that the vertical support of the first and second lower modules are adjacent;

securing a second coupler in the captured position within the axial hole in the second connection part of the vertical support of the second lower module, the second coupler having a threaded aperture therein;

placing a diaphragm plate over the second connection parts of the vertical supports of the first and second lower module; the diaphragm plate having a first bolt aperture aligned with the threaded aperture of the first coupler and a second bolt aperture aligned with the threaded aperture of the second coupler.

12. The method of claim 11, further comprising the step of, prior to placing the first upper module, temporarily securing the diaphragm plate to one of (a) the second coupler and (b) in the second connection part of the vertical support of the second lower module.

13. The method of claim 12, wherein the diaphragm plate and coupler have respective alignment holes therein, the step of temporarily securing the diaphragm plate comprising inserting a locking bolt through the diaphragm plate alignment hole and into the coupler alignment hole.

14. The method of claim 13 further comprising the step of removing the locking bolt after placing the first upper module.

15. The method of claim 14, the step of temporarily securing the diaphragm plate further comprising the steps of:

prior to placing the first upper module inserting a second bolt through the second bolt aperture and into the threaded aperture of the second coupler; and removing the second bolt after placing the first upper module.

16. The method of claim 10, further comprising the step of:

providing a lifting plate having lifting eye extending upwards therefrom;

securing the lifting plate in the captured position within the axial hole in the second connection part of the vertical support of the first upper module;

lifting the first upper module using a cable connected to the lifting eye; and removing the lifting plate after the placing the first upper module.

17. The method of claim 11, the diaphragm plate having an alignment member extending upwards therefrom, the first connecting part at the bottom end of the vertical support of the first upper module having a bottom surface with an alignment opening therein;

the step of placing the first upper module comprising lowering the first upper module onto the first lower module so the alignment member engages the alignment opening.

18. A connectable support element comprising:

an elongated hollow body having a central axis, first and second ends with respective first and second outer surfaces substantially perpendicular to the central axis, an interior, a first connection portion at the first end and a second connection portion at the second end;

the first connection portion comprising a bore along the central axis with a first opening adjacent the interior and having a first diameter, a second opening in the first outer surface and having a second diameter less than the first diameter, and a shoulder within the bore between the first opening and second opening, wherein a bolt having a head diameter less than the first diameter and greater than the second diameter and having a shank diameter less than the second diameter can pass partially through the bore with the shank extending therefrom;

the second connection portion comprising axial hole running from the second outer surface to the interior and having a diameter throughout greater than the head diameter of the bolt and an inward facing shoulder therein, the axial hole configured to allow a coupler in an insertion position to be moved from outside of the body adjacent the second end through the axial hole past the shoulder and to permit rotation of the coupler within the axial hole from the insertion position to a captured position where the shoulder blocks motion of the coupler towards the second end;

wherein the first connection portion of a first support element can be axially connected to the second connection portion of a second support element by inserting the bolt into the bore in the first support element via the second connection portion of the first support element and rotating the bolt so the shank engages a threaded aperture in a coupler mounted in the captured position within the axial hole of the second connection portion of the second support element.

19. The support element of claim 18, the axial hole in the second portion defining a first open area adjacent the second end into which the coupler can be placed when in the insertion position, and a second open area adjacent the first open area defining the, the second open area configured to permit rotation of the coupler when in the second area the first insertion position to the captured position wherein the shoulder prevents removal of the coupler from the second open area.

20. The support element of claim 18,
   the elongated body having four outer sides substantially parallel to the central axis and defining a rectangular circumference,
   the first open area having four inner sides substantially parallel to the central axis and defining a rectangular open area into which the coupler can pass;
   the rectangular open area rotated between 30 to 60 degrees relative to the rectangular circumference.

\* \* \* \* \*

UNITED STATES PATENT AND TRADEMARK OFFICE
CERTIFICATE OF CORRECTION

PATENT NO. : 10,907,342 B1  
APPLICATION NO. : 16/987641  
DATED : February 2, 2021  
INVENTOR(S) : Leon Parkhouse et al.

Page 1 of 1

It is certified that error appears in the above-identified patent and that said Letters Patent is hereby corrected as shown below:

In the Claims

Claim 5, Line 23, change "claim 1" to "claim 4"

Claim 9, Line 53, change "claim 7" to "claim 8"

Claim 10, Line 17, change "the top surface to the" to "a top surface to a"

Claim 16, Line 20, replace "the placing" with "placing"

Claim 19, Line 5, delete "defining the"

Claim 19, Line 6, after "second area" add the word "from"

Claim 19, Line 7, delete "first"

Claim 20, Line 1, change "claim 18" to "claim 19"

Signed and Sealed this  
Ninth Day of August, 2022

Katherine Kelly Vidal  
*Director of the United States Patent and Trademark Office*